UNITED STATES PATENT OFFICE.

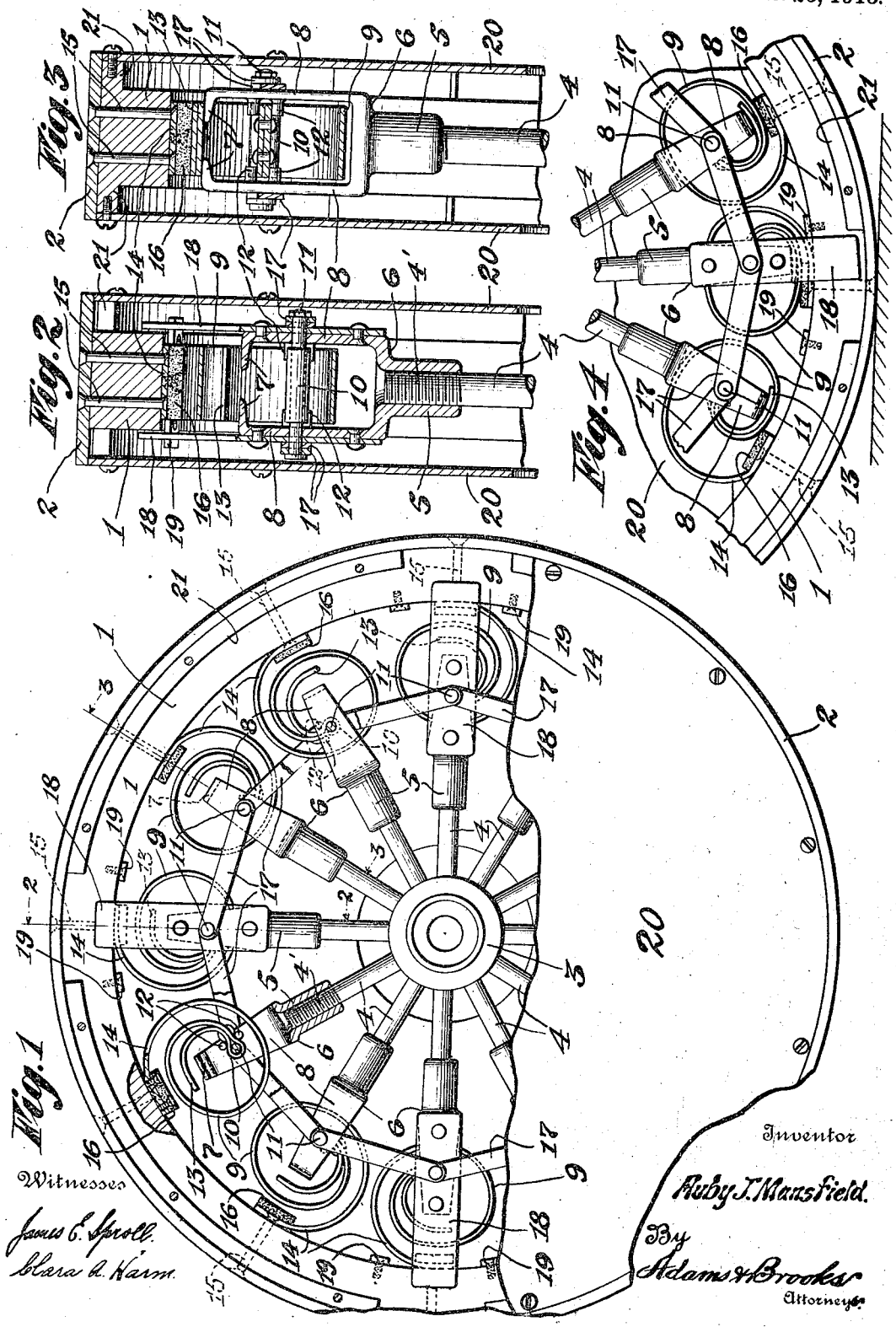
A. J. MANSFIELD.
VEHICLE WHEEL.
APPLICATION FILED APR. 15, 1914.
1,132,787. Patented Mar. 23, 1915.

AUBY J. MANSFIELD, OF SEATTLE, WASHINGTON.

VEHICLE-WHEEL.

1,132,787.     Specification of Letters Patent.     Patented Mar. 23, 1915.

Application filed April 15, 1914. Serial No. 831,969.

*To all whom it may concern:*

Be it known that I, AUBY J. MANSFIELD, a citizen of the United States of America, and a resident of the city of Seattle, in the county of King and State of Washington, have invented certain new and useful Improvements in Vehicle-Wheels, of which the following is a specification.

My invention has for its primary aim to provide a cushion wheel of automobiles and other vehicles to operate in an efficient manner, the cushion elements employed being coiled springs which are mounted on the outer ends of the spokes by furcated supports of simple construction.

Further objects of the invention will appear as the description progresses and those features of construction, arrangements and combinations of parts on which I desire protection will be succinctly pointed out in the appended claims.

For a full understanding of my invention reference is to be had to the following specification and the accompanying drawings wherein—

Figure 1 is a side elevation of my improved wheel with portions omitted. Fig. 2 is a section on line 2—2 of Fig. 1. Fig. 3 is a similar view on line 3—3 of Fig. 1 illustrating the abnormal position of the parts as when compressed on encountering an irregularity in the road surface, and Fig. 4 is a fragmentary side elevation of the wheel when disposed as in Fig. 3.

It may be preliminary mentioned that in my improved wheel, illustrated in the preferred embodiment in the drawings, there are employed a series of coiled flat springs interposed between the hub and felly, a furcated support for each spring mounted on the outer end of a spoke of the hub, a coupling or binding means connecting the supports for unison of circumferential movement, and means coacting with the supports for limiting such movement of the latter.

Referring more in particular to the drawings, and employing like characters of reference for similar parts throughout the several views, 1 denotes the wheel rim or felly bounded by the tire 2, and 3 indicates the hub having the rigid spoke sections 4 projecting radially therefrom.

The threaded outer end portions 4' of spoke sections 4 are received by threaded sockets 5 of furcated supports 6 which latter have the extremities 7 of their furcations or arms 8 turned inwardly to provide an abutment for the spring sections 9 of the spokes.

The springs 9 are each bent to form an eye 10, intermediate its ends, to receive the screw bolt 11 mounted on the arms 8 and is held against pivotal movement thereon by the stops or pins 12 on said arms engaging the opposite sides of the spring. The shorter terminal portion 13 of each spring 9 terminates directly over the abutments or stops 7 while the longer terminal portion 14 convolves about the shorter terminal portion and screw bolt 11 and is attached to the inner face of the rim by fasteners 15 which also pass through the tire for securing it to the rim. Bearing blocks 16, of rubber, leather, or other material, are secured to the spring terminals 14 to serve as buffers.

The screw bolts 11, of the adjacent supports 6, are connected by pairs of coupling links 17 which serve to bind the spokes for circumferential movement as a unit and yet permit of independent radial action.

To limit the relative circumferential movement of the outer and inner sections of the wheel, I provide on certain spring supports radial or outwardly extending fingers 18 which project between the component elements of pairs of stops 19. These stops comprise narrow plates arranged transversely on the inner face of the rim to project laterally from the same. I also provide guard plates 20 on the sides of the wheel to protect the working parts thereof from foreign matter. These plates completely inclose the inner portion of the wheel and are secured to sections of the interrupted rings 21 arranged on the side faces of the rim to provide clearance for the stops 19 and fingers 18.

The foregoing detailed description has been given for clearness of understanding only, and no undue limitation is to be understood therefrom, but the appended claims are to be construed as broadly as is permissible in view of the prior art.

Having thus described my invention, what I claim as new and desire to secure by Letters Patent of the United States of America, is:—

1. In a spring wheel construction, a hub, a rim encircling the hub, rigid spoke sections fixed on the hub, a furcated support on each spoke section, said support having the extremities of its furcations turned inwardly to form abutments, and springs interposed between the supports and the rim, each spring convolving about and being normally free of the abutments of its respective support.

2. In a spring wheel construction, a hub, a rim encircling the hub, rigid spoke sections fixed on the hub, a furcated support on each spoke section, said support having the extremities of its furcations turned inwardly to form abutments, a coiled spring mounted intermediate its ends between the furcations of each support, the ends of the spring terminating outwardly from the abutments of the support and in spaced relation with one another, and means for fastening the springs to the rim.

3. In a spring wheel construction, a hub, a rim encircling the same, rigid spoke sections fixed on the hub, furcated supports threaded on the spoke sections, springs interposed between the supports and the rim, means securing the springs between the furcations of the supports, links connecting the adjacent supports, and a guard plate on each side of the wheel for inclosing the springs and the supports.

Signed at Seattle, Washington this 30th day of March, 1914.

AUBY J. MANSFIELD.

Witnesses:
CLARA A. HARM,
H. E. SPENCE.